United States Patent [19]

Zaffiro

[11] Patent Number: 5,177,340
[45] Date of Patent: Jan. 5, 1993

[54] CONTROL OF RADIANT HEATING SYSTEM FOR THERMOPLASTIC COMPOSITE TAPE

[75] Inventor: Paul A. Zaffiro, Cincinnati, Ohio
[73] Assignee: Cincinnati Milacron Inc., Cincinnati, Ohio
[21] Appl. No.: 739,782
[22] Filed: Jul. 31, 1991

Related U.S. Application Data

[63] Continuation of Ser. No. 299,858, Jan. 23, 1989, abandoned.

[51] Int. Cl.⁵ .............................................. H05B 1/00
[52] U.S. Cl. .................................... 219/494; 219/388; 219/497; 219/491; 307/39
[58] Field of Search .............. 219/388, 492, 490, 494, 219/491, 501, 497, 499, 505, 506, 508–510; 307/38–41, 117

[56] References Cited

U.S. PATENT DOCUMENTS

| | | |
|---|---|---|
| 2,075,726 | 3/1937 | Kamerer . |
| 2,402,631 | 6/1946 | Hull . |
| 2,553,259 | 5/1951 | Hagedorn . |
| 2,622,053 | 12/1952 | Clowe et al. . |
| 2,721,821 | 10/1955 | Hoover . |
| 2,757,709 | 8/1956 | Crabbe et al. . |
| 2,770,566 | 11/1956 | Ritter . |
| 2,938,822 | 5/1960 | Nelson . |
| 3,106,502 | 10/1963 | Starger et al . |
| 3,130,101 | 4/1964 | Gittins et al. . |
| 3,247,041 | 4/1966 | Henderson . |
| 3,309,221 | 3/1967 | Smith . |
| 3,328,194 | 6/1967 | Kasper . |
| 3,474,952 | 10/1969 | Cover, Jr. et al. . |
| 3,556,887 | 1/1971 | Adcock et al. . |
| 3,679,518 | 7/1972 | Andler et al. .................. 219/497 |
| 3,698,973 | 10/1972 | Wisotzky et al. . |
| 3,823,209 | 7/1974 | Birckhead, Jr. et al. . |
| 3,869,330 | 3/1975 | Anderson et al. . |
| 3,879,251 | 4/1975 | Ingham . |
| 3,911,186 | 10/1975 | Trotman . |
| 3,930,917 | 1/1976 | Esakov et al. . |
| 3,976,528 | 8/1976 | James . |
| 4,090,902 | 5/1978 | Ferrentino et al. . |
| 4,146,420 | 2/1979 | Newkirk . |
| 4,174,237 | 11/1979 | Hemming, Jr. et al. . |
| 4,189,340 | 3/1980 | Newkirk . |
| 4,244,771 | 1/1981 | Pierce . |
| 4,370,189 | 1/1983 | Siedenstrang et al. . |
| 4,533,423 | 8/1985 | Johnson et al. . |
| 4,579,617 | 4/1986 | Oberg et al. . |
| 4,581,247 | 4/1986 | Wood . |
| 4,595,433 | 6/1986 | Ford et al. . |
| 4,664,738 | 5/1987 | Tadros . |
| 4,714,509 | 12/1987 | Gruber . |
| 4,719,397 | 1/1988 | Kneifel, II et al. . |
| 4,764,328 | 8/1988 | Matz et al. . |
| 4,775,776 | 10/1988 | Rahn et al. .................... 219/388 |

OTHER PUBLICATIONS

Griffiths et al. "Manufacturing Techniques for Thermoplastic Matrix Composites", SAMPE Journal, Sep.-/Oct. 1984, pp. 32–35.
"News in Advanced Composites", Plastics Technology, Mar. 1987, pp. 60–61.
Hillier, "Automated Laminating Techniques Emerging for Large Composite Structures", Plastics & Rubber Weekly, Oct. 17, 1987, pp. 22–23.
Duthie, "Engineering Substantiation of Fibre Reinforced Thermoplastics for Aerospace Primary Structure", 33rd Int'l SAMPE Symposium, Mar. 7–10, 1988, pp. 296–307.
Griffiths et al. "Thermoplastic Composite Manufacturing Technology for a Flight Standard Tailplane", 33rd Int'l SAMPE Symposium, Mar. 7–10, 1988, pp. 308–316.
Hillier, "Fibre Reinforced Thermoplastic Fabrication Technology for Helicopter Primary Structure", Polymers in defence, pp. 10/1–10/10, 1989.
Cincinnati Milacron Brochure SP-158., Dec. 1987.
Cincinnati Milacron Brochure SP-152-3, Dec. 1987.
FIG. 13–10. W. Sieber, Z. tech. Physik, 22:130–135 (1941) (Dec.).

Primary Examiner—Mark H. Paschall
Attorney, Agent, or Firm—John W. Gregg

[57] ABSTRACT

A radiant heating control system for a computerized tape laying machine is described in which the radiant heater is controlled so as to reliably heat thermoplastic composite tape to a processing temperature above the melting point of the thermoplastic matrix irrespective of velocity or change in velocity of the tape as it travels from a spool of tape to a tape application point for application to a layup tool or the like.

24 Claims, 3 Drawing Sheets

CONTROL OF RADIANT HEATING SYSTEM FOR THERMOPLASTIC COMPOSITE TAPE

This is a continuation of copending application Ser. No. 07/299,858 filed on Jan. 23, 1989 now abandoned.

BACKGROUND OF THE INVENTION

I. Field of the Invention

This invention relates to radiant heating control systems by which to melt the thermoplastic matrix of a travelling web of thermoplastic composite tape for application by a tape dispensing apparatus. More particularly, the present invention relates to such a heating control system in which melting of the thermoplastic matrix of the travelling web is reliably accomplished irrespective of the velocity or changes in velocity of the travelling tape web.

II. Description of the Prior Art

By way of background, computerized tape-laying machines have been utilized to apply strips of composite tape material to a layup tool or the like to build up or form a part such as an aircraft wing, for example. One such composite tape material includes graphite fibers and epoxy embedded in a thermosetting plastic matrix. To apply the tape, a computerized tape laying machine may include a tape dispensing apparatus or tape applicator which is positionable and movable under computer control relative to the layup tool to pay-off and apply strips or courses of tape to build up multiple plies of tape forming the desired part. Conventionally, the tape applicator is suspended from a carriage which in turn is suspended from a gantry supported off the ground by pylons. Each of the applicator, carriage and gantry are movable such that tape may be applied to the layup in any desired pattern under control of a computer program. An example of one such system is described in U.S. Pat. No. 4,719,397 assigned to the assignee hereof, the disclosure of which is incorporated herein by reference.

Conventionally, tape dispensing apparatus of the type described in U.S. Pat. No. 4,719,397 have been used to apply thermosetting composite tape as above-described to the mold or layup tool. Thermosetting composite tape is easy to work with in that it is moldable and tacky at or around room temperature. While thermosetting composite tape has many desirable attributes, use of such tape does have some disadvantages. For example, once a part is formed with plies of thermosetting composite tape, the part must be cured. Such a cure process may take a great deal of time and energy. Further, such tape, once cured, may not be reformed. Thermosetting composite tape may also have an undesirably limited storage life.

Thermoplastic composite tapes have been developed which are believed to be superior to thermosetting composite tape. Such tapes utilize a thermoplastic matrix supporting the graphite fibers rather than a thermoset plastic matrix. In particular, certain new resins, particularly polyetheretherketone (PEEK available from ICI Americas, Inc.) and polyphenylene sulfide (PPS, also called RYTON, available from Phillips Petroleum) and the polyimides provide a thermoplastic matrix with properties equivalent to or superior to those of a typical thermoset plastic matrix.

Further, to cure thermoplastic composite tape after it is applied is not generally as energy-intensive and time-consuming as the cure for thermosetting composite tape. Despite superior material properties, however, tape having a thermoplastic matrix is difficult to manipulate to form the parts initially. Unlike thermosetting composite tapes which have natural adhesive properties due to the epoxy in the matrix, thermoplastic composite tape is not sticky (tacky) at ambient temperature, and will not readily adhere to previous plies of such tape or to a mold surface. Additionally, in its natural state, thermoplastic matrix material is very stiff and virtually nonconformable. Thus, to build components from thermoplastic composite tape requires that the tape be heated to at least the melting point of the thermoplastic matrix, such as 450° F. or higher, and usually above 650° F. (for PEEK), for example. The treated tape must then be fused to the previous plies of tape in its molten state, and the combined plies cooled under pressure to avoid separation.

Infrared or quartz bulb heaters have been proposed for heating the thermoplastic composite tape. However, control of the heaters so as to reliably melt the thermoplastic matrix is difficult in computerized tape laying apparatus. As is typical with such tape applicator systems, the various movements of the system result in widely fluctuating velocities of the tape as it is applied to the surface. For example, the tape may be moving at a velocity between zero and twenty inch/second and with possibly dramatic changes in velocity. Thus, if the heater bulbs are energized to emit radiant energy at a level sufficient to melt the thermoplastic matrix when the tape is moving relatively slowly, such as at 1 inch/second, the thermoplastic matrix will not be melted when the tape is moving relatively rapidly. Moreover, unless the energy level for the heater is raised accordingly, the tape will not be melted as it accelerates. Similarly, if the heater bulbs are energized to emit radiant energy at the higher level necessary to melt the thermoplastic matrix during periods of high speed travel of the tape, the tape will likely be burned or otherwise damaged as the tape velocity is reduced. Thus, heating of the tape must be carefully regulated so that melting is achieved without burning or otherwise damaging the tape. It is believed, however, that merely varying heater energization level proportionally with the velocity of the tape is insufficient to reliably melt the thermoplastic matrix over the range of speed and acceleration encountered in typical computerized tape laying applications.

The task of reliably melting the thermoplastic matrix of the tape is further complicated because the mechanics of a computerized tape laying system minimize the area available to devote to heating the tape. That is, the temperature of the moving tape must be elevated as much as about 600° F. above room temperature at a point just prior to application so that it does not appreciably cool before contact with the surface. In a computerized tape laying machine, therefore, heating must take place on the movable tape applicator leaving very little space for the heater. As a consequence, the tape may be exposed to the heat source for only a very brief duration during which the temperature of the tape must be rapidly elevated.

SUMMARY OF THE INVENTION

The present invention provides a system which rapidly, yet reliably heats the thermoplastic of a thermoplastic composite tape to a process temperature at which the thermoplastic is in a molten condition as the tape travels towards a surface for application thereto irrespective of the velocity or changes in velocity of the tape. Moreover, the present invention provides such a system in which heating of the tape is accomplished on a movable tape applicator of a computerized tape-laying machine. Thus, in accordance with the principles of the present invention, the amount of radiant energy generated by a radiant heater mounted on the tape applicator is varied in relation to a control signal correlated to the temperature and velocity of the heated tape so as to elevate the temperature of the tape to the desired processing temperature for all normally encountered speeds and changes in speed of the tape without damaging the tape such as by overheating. The processing or desired temperature is at or above the melting point of the thermoplastic matrix but below the temperature at which the thermoplastic matrix will become damaged.

In a preferred embodiment, the control signal is comprised of a predictive component and a compensation component. The predictive component constitutes a feed forward signal representative of the nominal amount of radiant energy then-required to heat the thermoplastic matrix of the tape to the processing temperature. This nominal energy level is determined by taking into account plant model characteristics of the heater/tape system dependent upon actual temperature and velocity of the heated tape. More particularly, based upon heat generating capability of the heater, and heat response characteristics of the tape at the present temperature of the tape, a prediction may be made of the necessary energy required from the heater to elevate the temperature of the tape to the processing temperature in the time available under the heater as determined by the present velocity of the tape. The feed forward signal generates a nominal control signal which is thus a function of tape velocity and tape temperature, including heat losses to the surroundings.

The predictive component of the control signal is utilized to cause the heater to output radiant energy at or about a predicted or nominal level. However, it may occur that the predicted or nominal level of energy is not precisely accurate. Thus, the infrared heater may cause the tape to be heated near to, but not quite at, the desired temperature. To compensate for such errors, a compensation component of the control signal is provided. The compensation component is derived from the error between desired and actual heated tape temperature and is superimposed on the predictive component to force the control signal to a value more accurately indicative of necessary radiant heat generation. The compensation component thus accounts for errors or perturbations about the nominal control signal. Preferably, the compensation component of the control signal is proportionally and integrally related to the temperature error of the heated tape to ensure good transient response characteristics. By virtue of the foregoing, tape temperature is maintained at or about (for example, within 30°-80° of) a desired processing temperature of 700° F., for example, irrespective of the tape velocity or changes in tape velocity (acceleration) normally encountered in a computerized tape laying machine.

Preferably, temperature of the heated tape is sensed by a non-contact infrared pyrometer situated at the downstream end of the heater just prior to the point of tape application. Such a pyrometer senses infrared energy and calculates temperature therefrom. Moreover, such a sensor reacts rapidly to temperature changes and thus provides desired sensitivity and quick responsiveness for generation of the control signal. To prevent the temperature sensor from reacting to the radiant energy emitted by the heater rather than only the tape, the sensor is shielded from radiant energy emitted by the heater. In accordance with one aspect of the invention, this shielding is accomplished by placing the radiant heater and sensor on opposite sides of the path of tape travel. Thus, as the tape travels along the path, it will pass between the heater and the temperature sensor thereby shielding the sensor from the radiant energy emitted by the heater.

In accordance with a further aspect of the invention, the minimum operating point of the quartz heater bulbs is elevated above the normal minimum so that the bulbs have a more rapid response to changes in the control signal when it is at a very low level such as at standstill of the tape. At standstill of the tape, the control signal would be at a very low level which would normally cause the quartz infrared heaters to be operating at a level at which the heater is slow to initially respond to a control signal requiring greater levels of radiant energy output. To increase bulb operating point, air blasted over the quartz heater bulbs to cool them is also blown over the heated tape to thereby cool same. The tape temperature is thus lowered resulting in a larger temperature error which in turn results in an increase in the compensation component of the control signal. Consequently, the control signal at tape standstill is larger than would otherwise be required causing the heaters to emit radiant energy at a higher level, i.e., the operating point is raised. Thus, as the tape begins to move, the operating point of the heater bulbs is sufficiently high that they will respond rapidly to changes in the control signal. Accordingly, reliable control of the heater is achieved across the range of tape speed and tape acceleration normally expected to be encountered.

These and other objects and advantages of the present invention shall be made apparent from the accompanying drawings and the descriptions thereof.

BRIEF DESCRIPTION OF THE DRAWINGS

The accompanying drawings, which are incorporated in and constitute a part of this specification, illustrate an embodiment of the invention and, together with a general description of the invention given above, and the detailed description of an embodiment given below, serve to explain the principles of the invention.

DETAILED DESCRIPTION OF THE DRAWINGS

Figure 1:
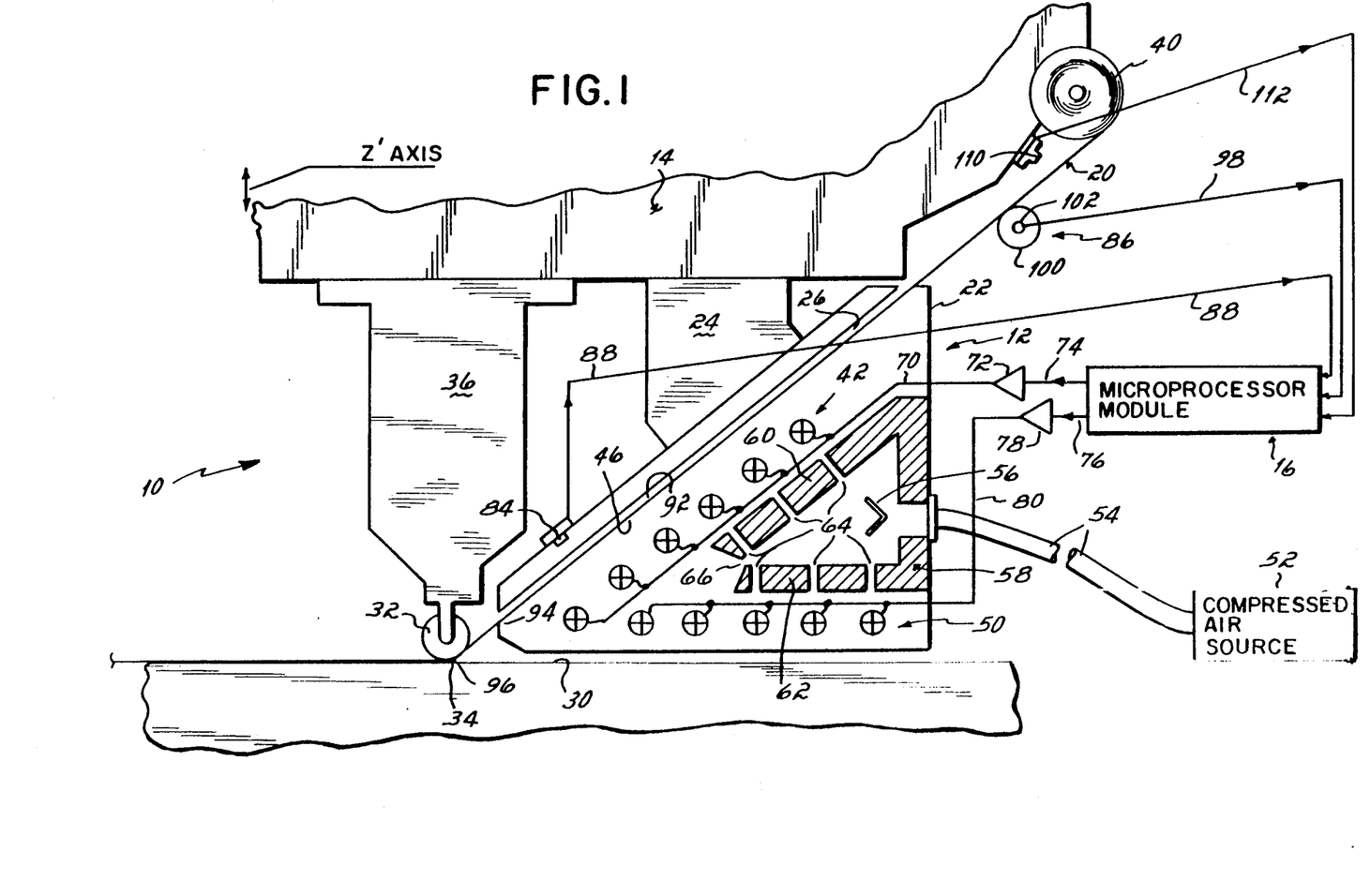
FIG. 1 is a schematic, side elevational view of a tape applicator mounted infrared heating system for thermoplastic composite tape in accordance with the principles of the present invention.

With reference to FIG. 1, there is shown an infrared heating control system 10 comprised of an infrared radiant heating system 12 mounted to a movable tape applicator 14 of a computerized tape laying machine and the associated microprocessor control module 16. In response to control signals from control module 16, the level of radiant energy emitted by infrared heating system 12 is varied so as to reliably melt the thermoplastic matrix of a travelling web of thermoplastic composite tape 20 according to the principles of the present invention.

Radiant heating system 12 includes a radiant heater housing 22 mounted by support 24 to tape applicator head 14 for movement therewith. Housing 22 includes a diagonal slot 26 colinear with the path of travel of tape 20 and through which tape 20 passes to become heated prior to application to a prior tape ply or other surface 30 (such as a layup tool) as it passes under compaction roller 32 such as at tape application point 34. Roller 32 may be a ⅝ inch diameter, 3 inch long steel roller riding on a bronze air bearing assembly 36 supported from tape head 14. Compressed air may be coupled to assembly 36 to provide air pressure for roller 32. The compaction force exerted by roller 32 at point 34 may be regulated by varying the vertical position of head 14 such as by adjusting the pressure in counterbalance fluid actuators of the little Z (or Z') axis as described in the aforesaid U.S. Pat. No. 4,719,397.

Figure 3:
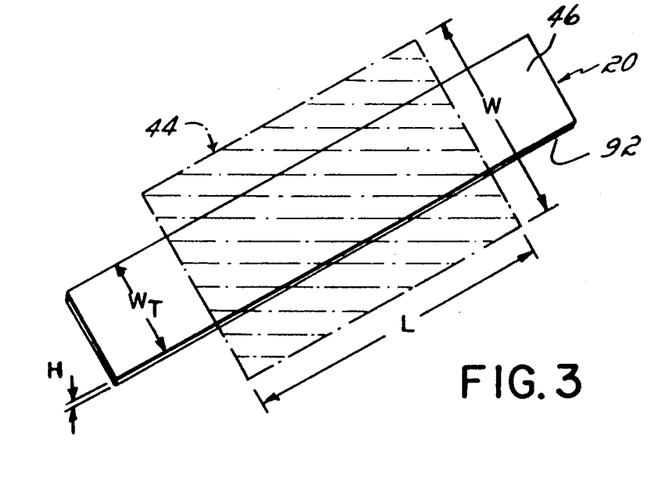
FIG. 3 is a perspective view of a portion of the thermoplastic tape for purposes of explaining the present invention.

Tape 20 travels along a path between a source of unheated tape such as spool 40 mounted for movement with tape applicator 12 and tape application point 34 under roller 32. In order to prepare tape 20 for application by shoe 32, tape 20 must be heated to a processing temperature at which the thermoplastic matrix is melted. To this end, tape 20 also passes through heater housing 22 along slot 26 whereat tape 20 is heated by an upper bank of quartz infrared emitting tubes or bulbs 42. Preferably, six such bulbs 42 are provided, each transverse one side of the path of travel of tape 20 and spaced about one inch apart to provide a heating zone 44 having a length L of about six inches (see FIG. 3). Bulbs 42 are spaced about ¾ inch from the exposed side 46 of tape 20. Heating zone 44 also has a width W equal to the width of slot 26 which, in the embodiment shown in FIG. 1 is equal to the length of a bulb 42 (i.e., also six inches), to define a heating zone 44 of area $A_H$.

As will be appreciated, it is also desirable to heat surface 30 so that a previous layer of tape thereon will be melted to enhance consolidation with new tape layer 20 as it is compacted thereagainst. To this end, lowermost bulb of the upper bank of bulbs 42 cooperates with a lower bank of bulbs 50 to heat surface 30. Bulbs 50 are generally parallel lowermost bulb 42 and surface 30, and are also generally transverse the path of movement of head 14 which is from left to right as seen in FIG. 1.

Preferably, air is blown over bulbs 42, 50 to prolong the life of the quartz envelope of the bulbs. In accordance with a feature of the present invention, some of the air is also blown over tape 20 thereby cooling same whereby to raise the operating point of bulbs 42, 50 as will be hereinafter described. The air may be obtained from a source of compressed air 52 coupled to housing 22 via hose 54. Mounted within housing 22 is a baffle 56 to direct the stream of air from hose 54 towards air guide assembly 58 having an upper wall 60 parallel upper bank of bulbs 42 and a lower wall 62 parallel lower bank of bulbs 50. Assembly walls 60, 62 are apertured as at 64 to provide air guides to focus blasts of compressed air over some of bulbs 42 and 50. At the junction of walls 60, 62, a conical cross-section opening 66 is provided to direct a jet of air over the other of bulbs 42, 50. The air blasts passing over bulbs 42 contact tape 20 in slot 26 to thereby cool same.

To control the level of radiant energy emitted, bulbs 42 are responsive to a driving signal on line 70 from amplifier 72 which, in turn, is responsive to a control signal on line 74 from microprocessor module 16. Similarly, bulbs 50 are responsive to a control signal on line 76 from module 16 via amplifier 78 and line 80.

Microprocessor module 16 is programmed with plant model characteristics as will be described by which to generate the appropriate control signals correlated to the current temperature and velocity of tape 20. To this end, radiant heating system 12 also includes a temperature sensor 84 mounted to housing 22 to sense the temperature of tape 20 heated by radiant energy from bulbs 42 and a tachometer 86 to sense the velocity of tape 20. To receive a signal indicative of the actual temperature of heated tape 20, microprocessor module 16 periodically interrogates sensor 84 over line 88. Microprocessor module also periodically monitors line 98 for a signal from tachometer 86 to determine the actual velocity of tape 20 as it travels between spool 40 and shoe 32.

Temperature sensor 84 is preferably a non-contact infrared pyrometer, such as a Model TM-1 temperature monitor with a detector head designed to have a rectangular (rather than circular) spot size of about 1.0 inch by 0.25 inch at a four inch target distance, available from Vanzetti Systems, Stoughton, Mass. Sensor 84 is shown mounted to housing 22 opposite bulbs 42 such that slot 26 passes between bulbs 42 and sensor 84. Thus, as tape 20 travels through housing 22, surface 46 thereof is exposed to bulbs 42 by which tape 20 is heated through, while sensor 84 monitors surface 92 of tape 20 for radiant energy emitted thereby indicative of heating of tape 20. By positioning sensor 84 and bulbs 42 on opposite sides of the path along which tape 20 is to travel, tape 20 will form a partition or shield between infrared heater bulbs 42 and infrared pyrometer 84 such that pyrometer 84 will not likely receive infrared energy radiated from bulbs 42 but instead will receive such energy radiated only by tape web 20. In this way, the temperature of tape 20 sensed by pyrometer 84 will be generally free of contamination due to heater effects.

Preferably the thermoplastic matrix of tape web 20 is to be heated to the processing temperature by the time it leaves heater housing 22. Thus, it is desired to sense the temperature of tape 20 as it exits housing 22. To this end, pyrometer 84 is preferably positioned as close to downstream edge 94 of housing 22 as possible. Further preferably, to reduce the amount of cooling of tape 20 after it is heated, heater housing 22 is positioned such that edge 94 is in close proximity to compaction roller 32 to thereby minimize the length of tape travel between heater housing 22 and terminus 96 (at contact point 34) of tape web 20 whereat tape web 20 is applied to surface 30.

Upstream of housing 22, tachometer 86 may include a friction roller 100 such as a rubber coated steel roller mounted for rotation with a shaft 102 to provide signals on line 98. As is conventional, roller 100 may be spring biased (not shown) into contact with surface 46 or 92 of tape 20 to rotate as tape 20 moves from spool 40 to terminus 96. In one embodiment, the tachometer constant of tachometer 86 is 2.31 in/sec/volt.

For purposes to be subsequently explained, radiant heating system 14 may include a second temperature sensor 110 to monitor the temperature of the unheated tape 20 or the ambient room temperature housing the tape laying machine to which applicator 12 is mounted. The output of sensor 110 is coupled to microprocessor module 16 over line 112 for periodic monitoring.

Figure 2:
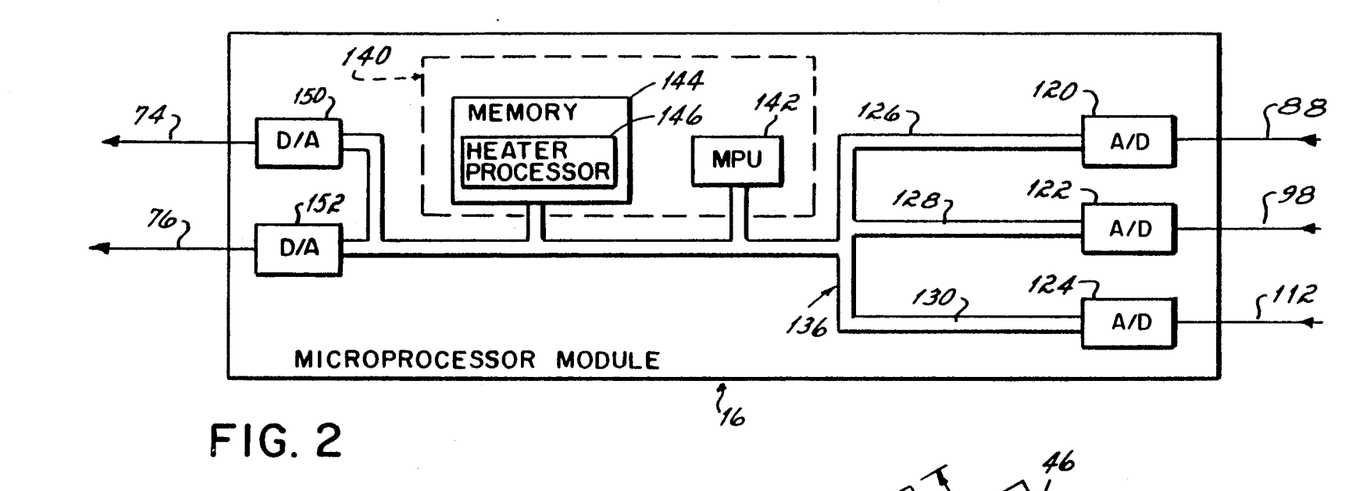
FIG. 2 is a block diagram of the computer control module of FIG. 1.

With reference to FIG. 2, there is shown a block diagram of microprocessor module 16. Inputs to module 16 include voltage signals from sensors 84, 86 and 110 appearing on lines 88, 98 and 112. Within module 16, these voltage signals are converted to digital words by analog-to-digital (A/D) converters 120, 122, and 124, respectively. Although shown separately, A/D converters 120, 122 and 124 may be comprised of a single A/D converter by using well known multiplexing techniques. In any event, output 126 resulting from the A/D conversion represented by converter 120 is a digital word $T_T$ corresponding to the actual temperature of heated tape 20 based upon the most recent reading taken by pyrometer 84 just as tape 20 is about to exit heater housing 22. Similarly, output 128 resulting from the A/D conversion represented by converter 122 is a digital word $V_T$ corresponding to the actual velocity of tape web 20. In like fashion, output 130 resulting from the A/D conversion represented by converter 124 is a digital word $T_R$ corresponding to the ambient room or unheated tape temperature then-prevailing as will be described.

The digital words on outputs 126, 128, and 130 are coupled to a common bus 136 for communication with microprocessor system 140 within module 16. Microprocessor system 140 includes a microprocessor and associated peripheral devices 142 and memory 144 as required for the function of heating control, all coupled to bus 136. In accordance with a program 146 stored in memory 144, and plant model characteristics also stored in memory 144, microprocessor 142 manipulates the digital words from A/D converter 120, 122 and 124 to generate a digital control word $U_1$ coupled to digital-to-analog (D/A) converter 150 to produce a current control signal for the upper bank of bulbs 42 on output 74 of module 16. Control word $U_1$ includes a predictive component $U_{FF}$ and a compensation component $U_{COMP}$ as will be described below. Module 16 may also generate a second digital control word $U_2$ coupled to D/A converter 152 to produce a current control signal for lower bank of bulbs 50 on output 76. The second control word $U_2$ similarly includes a predictive component and a compensation component and may, in a preferred embodiment, be proportional to the first control word $U_1$. In one embodiment, the current control signals range between 4 and 20 mA to drive amplifiers 72, 78, each which may be a 40 A Eurotherm SCR amplifier powered from a 220 volt, 3-phase supply (not shown).

In accordance with the principles of the present invention, the feed forward component of the control word $U_1$ is intended to cause bulbs 42 to emit radiant energy at a level sufficient to melt the thermoplastic matrix of that portion of tape 20 within heater zone 44 at the then-existing velocity of the tape. To accomplish this, microprocessor system 140 takes into account certain characteristics of the radiant heating system 12 and tape 20. With respect to heating system 12, it has been determined that the heater gain ($K_H$), the efficiency ($\epsilon_H$) of bulbs 42, the area of the heating zone ($A_H$), the reflectivity ($R_F$) of the heater and a shape factor ($S_F$) therefor are pertinent in a preferred embodiment. Similarly, in a preferred embodiment, the tape characteristics of emissivity ($\epsilon_T$), average density ($\rho$), average specific heat (c), cross-sectional area ($A_C$) measured transverse the width $W_T$ of the tape and equal to its width $W_T$ times its height H (see FIG. 3), and its absorptivity ($\alpha$) to infrared radiation are pertinent. The above characteristics are utilized to determine the level of radiant energy which, theoretically, must be emitted by bulbs 42. That level is indicated by the feed forward or predictive component $U_{FF}$ of control word $U_1$ which is based upon the heat output capability of bulbs 42, heat losses of system 14 and heat response characteristics of tape 20. These heat characteristics are referred to herein as heat loss, heat load and useful heat output.

Heat loss ($H_{LOS}$) of system 14 include radiation heat losses and convection heat losses, and may be determined from the formula:

$$H_{LOS} = \epsilon_T \cdot \sigma \cdot (T_T^3 - (T_T \cdot T_R^2) - (T_R \cdot T_T^2) - T_R^3) - H_C \quad (1)$$

wherein $T_T$ is the temperature of tape 20 as measured by pyrometer 84; $T_R$ is the ambient or unheated tape temperature as measured by sensor 110; $\sigma$ is Stephan-Boltzman's constant and $H_C$ represents convection losses. Preferably, $T_R$ is the actual, current unheated tape temperature. In many applications, spool 40 of tape 20 is situated in an environment which is temperature regulated. Under such circumstances, it may be sufficient to monitor the ambient temperature of the environment and use that value as $T_R$. Further, where the ambient temperature is known, such as where it is tightly regulated, $T_R$ may be a fixed value input to microprocessor system 140 by an operator via a keyboard or the like (not shown) as is well understood. In one embodiment, with temperature taken in degrees Kelvin, $\epsilon_T = 0.64$; $\sigma = 5.669 \times 10^{-8}$ W/m$^2$°K$^4$; and $H_C$ is assumed equal to 10.0 W/m$^2$°K. The value of tape emissivity ($\epsilon_T$) is between 0.0 and 1.0 and may be determined by placing on tape 20 a block (not shown) heated to a known temperature. Vanzetti pyrometer 84 preferably includes an emissivity dial (not shown) to calibrate a digital temperature display on pyrometer 84. The emissivity dial is adjusted until the temperature displayed by pyrometer 84 is equal to the known temperature of the heated block. The emissivity dial setting is the emissivity of tape 20 which value is entered into microprocessor system 140 via a keyboard or the like (not shown).

Heat load ($H_{LOD}$) of system 14 may be determined according to the formula:

$$H_{LOD} = \rho \cdot A_C \cdot V_T \cdot c \quad (2)$$

wherein $V_T$ is the velocity of the tape as measured by tachometer 86. With a standard thermoplastic composite tape 20 having a width ($W_T$) of 3 inches and a height or thickness (H) of about 0.007 inches, $\rho = 1570.0$ Kg/m$^3$; $A_C = 0.00135$ m$^2$; and c = 1170.0 J/Kg°K.

Useful heat output (q) of bulbs 42 may be determined according to the formula:

$$q = K_H \cdot \epsilon_H \cdot \alpha \cdot S_F \cdot R_F \quad (3)$$

Preferably, six quartz heater bulbs 42 are employed, each having a maximum output of 2200 watts. Thus, heater output is a total of 13200 watts spread over the total number of control units specified from microprocessor system 140. In one embodiment, the maximum number of control units specified from microprocessor system 140 is defined as ten such units. Hence, heater gain $K_H$ in this embodiment is 1320 W/control unit. Efficiency ($\epsilon_H$) of such quartz bulbs is known to be about 0.86. As a preferred system utilizes tape 20 having a width $W_T$ of about 3 inches, but bulbs 42 are generally six inches in length, approximately half of the radiant energy from bulbs 42 will not impinge surface 40 of tape 20. Hence, a shape factor ($S_F$) of 0.50 is used. The reflectivity factor ($R_F$) is experimentally determined and in one embodiment is 0.59. To determine $R_F$ the tape is moved at a predetermined velocity while the $U_{COMP}$ component of the control word $U_1$ is held at zero. The value of $R_F$ is then adjusted until the $U_{FF}$ component alone heats the tape to the desired temperature. Finally, the absorptivity $\alpha$ of tape 20 may be determined from FIG. 13-10 of W. Sieber, Z. Tech Physik, 22:130-135 (1941). In one embodiment, tape 20 includes graphite. Also, bulbs 42 have a surface temperature of about 4000° F. which provides a value of $\alpha$ equal to approximately 0.80.

The above heat factors, with their values adjusted to correlate the units involved, e.g., °F. to °K., Joules/sec to watts, etc., are utilized to determine the feed forward predictive component $U_{FF}$ of the control word according to the formula:

$$U_{FF} = \frac{([H_{LOD} - H_{LOS} \cdot A_H]) \cdot \Delta T_D}{\alpha} \quad (4)$$

wherein $A_H$ is the heater zone area and $\Delta T_D$ is the necessary temperature increase from the unheated tape temperature to the processing temperature, as determined from the formula:

$$\Delta T_D = T_D - T_R \quad (5)$$

wherein $T_D$ is the desired processing temperature input to microprocessor system 140 by an operator through a keyboard, for example, and $T_R$ is the value from sensor 110 or a supplied value as previously discussed.

By virtue of the foregoing, the predictive component $U_{FF}$ of control word $U_1$ may be developed based upon plant model characteristics and in partial dependence upon the velocity of tape 20 along path 26 (the $H_{LOD}$ portion) and the temperature (the $H_{LOS}$ portion) thereof. This predictive component is correlated to the amount of energy required from bulbs 42 to heat to the processing temperature the portions of tape 20 passing through heater zone 44 per unit time. Thus, at maximum velocity, $U_{FF}$ is at a maximum and as the velocity decreases, $U_{FF}$ also decreases. The predictive component thus causes bulbs 42 to radiate energy at a level which nominally should heat the tape to a temperature at which the thermoplastic matrix of tape 20 is melted at whatever speed tape 20 is travelling by taking into account velocity and temperature of the heated tape.

Errors between desired and actual heated tape temperature may occur. Such perturbations require an adjustment in the control word to change the energy level radiated by bulbs 42 from the nominal level directed by the feed forward component. To this end, microprocessor system 140 is also programmed to provide a compensation portion ($U_{COMP}$) to the control word $U_1$ to offset such perturbations. Determination of the compensation portion is preferably accomplished by a digital implementation of a lead-lag filter with a parallel integrator to filter the temperature error and provide a compensation signal $U_{COMP}$. More specifically, the temperature error, which is the difference between desired and current heated tape temperature:

$$T_{err} = T_D - T_1 \quad (6)$$

is separately multiplied by a varying proportionality factor and a varying integral factor and the results combined to provide a proportional/integral compensation control word $U_{COMP}$.

The proportional or lead-lag filter portion ($U_P$) of $U_{COMP}$ is determined according to the digitized differential equations $$U_P = (1 - B) \cdot XT - K_P \cdot R_K \cdot T_{err} \quad (7)$$

wherein A and B are the zero and pole, respectively of the digitally implemented lead-lag filter in accordance with the formulae:

$$A = -e^{(zero \cdot RATE)} \quad (8)$$

$$B = -e^{(pole \cdot RATE)} \quad (9)$$

wherein RATE is the iteration rate of processor system 140; XT is the state value at the time; $K_P$ is a proportionality constant; and $R_K$ is the inverse of the DC gain of the digital filter.

In one embodiment, with an iteration rate of 0.005 sec, a zero of 2.0 rad/sec and a pole of 7.0 rad/sec, $A = -0.905$ and $B = -0.705$; $K_P = 0.05$; and $$R_K = \frac{1 - B}{1 - A} = 3.105;$$

XT is initially set equal to zero and on each update or iteration as will be described, it is updated according to the formula $$XT = -B \cdot XT - K_P \cdot R_K \cdot T_{err} \quad (10)$$

wherein the values are those given above.

The compensator component of control word $U_1$ also includes an integral portion ($U_I$) which is initially set to zero and updated on each iteration as follows:

$$U_I = U_I - K_P \cdot RATE \cdot T_{err} \quad (11)$$

wherein $K_I$ is an integral constant and RATE is the iteration rate. In one embodiment, $K_I = 0.1$; and RATE $= 0.005$ second.

Taking into account $U_P$ and $U_I$, the compensation component of the control word is found by summing $U_P$ and $U_I$ as follows:

$$U_{comp} = U_P - U_I \quad (12)$$

The value of $U_{comp}$ is superimposed on, or added to, the value of $U_{FF}$ to provide the control word $U_1$:

$$U_1 = U_{comp} + U_{FF} \quad (13)$$

and the value of $U_1$ utilized to control the level of radiant energy emitted by bulbs 42.

The lower bank of bulbs 50 may be similarly controlled. In one embodiment, lower bank of bulbs 50 is controlled by a second control word $U_2$ which is proportional to the first control word as follows:

$$U_2 = U_1 \cdot k_{P2} \quad (14)$$

In one embodiment, $k_{P2} = 1.0$ in which event $U_2 = U_1$.

Figure 4:
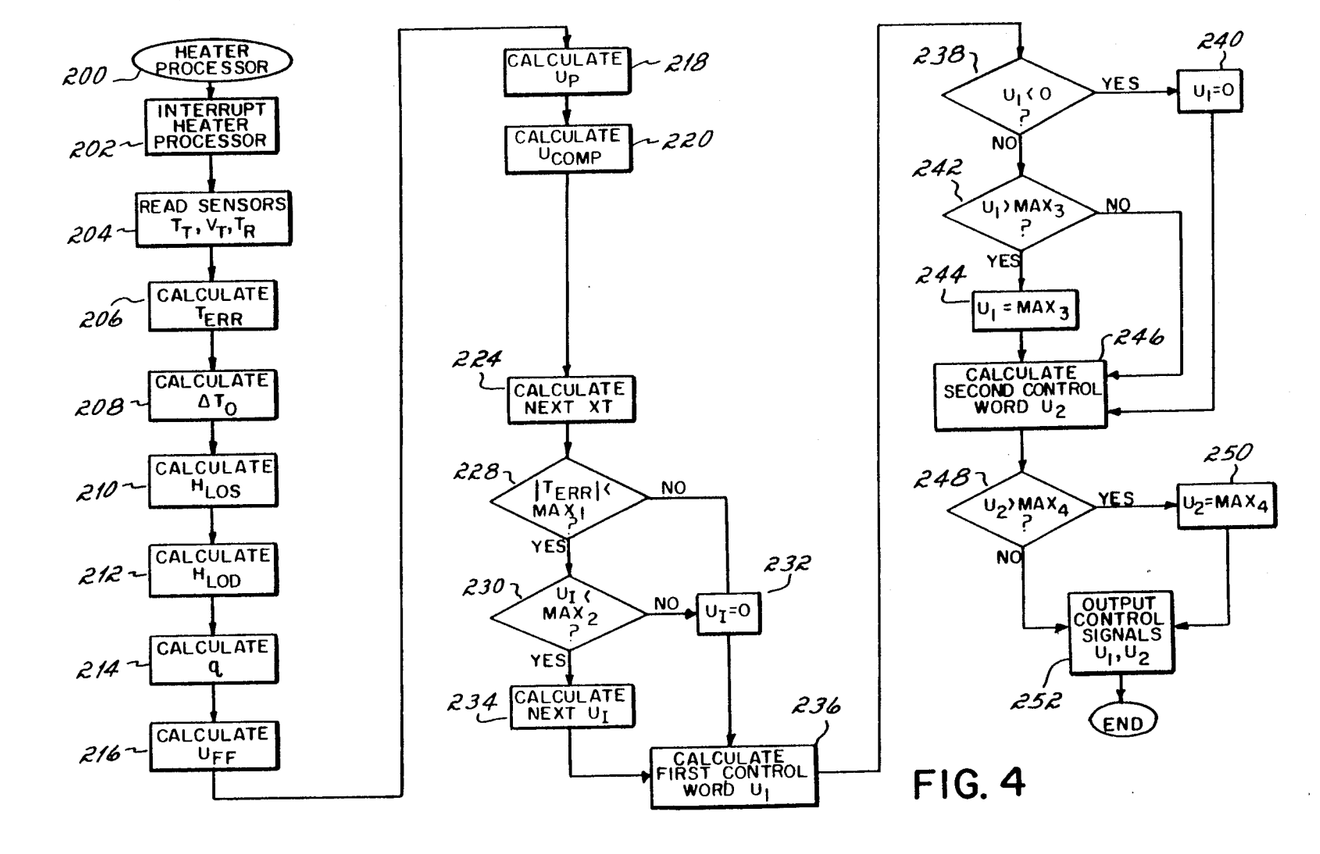
FIG. 4 is a flow chart of a software sequence for operation of the control module of FIG. 2.

The foregoing determination of the control words may be accomplished in accordance with the flow chart of FIG. 4 which may be implemented by a microprocessor system 140 forming part of a servo control system which controls various machine movements of a computerized tape laying machine such as that described in U.S. Pat. No. 4,719,397, which has been incorporated herein by reference. Such a microprocessor system handles many functions and thus may be responsible for running numerous different routines and subroutines which control movement of the tape applicator, for example. The microprocessor system may also run a routine referred to herein as "Heater Processor" as indicated at step 200 of FIG. 4. Microprocessor system 140 may be an interrupt driven system in which selected software routines are run at various or specified intervals. In one embodiment of the present invention, the Heater Processor routine is preferably initiated every 5 ms (0.005 seconds) by an appropriate interrupt to system 140 as indicated at step 202 of FIG. 4. With the Heater Processor routine begun, operation of system 140 will proceed to step 204 whereat sensors 84 and 86 and, if supplied, sensor 110 are read to obtain digital words $T_T$, $V_T$, and $T_R$. Alternatively, $T_R$ may be a value keyed into memory 144 of microprocessor system 140. From step 204, the sequence proceeds to step 206 whereat $T_{err}$ is calculated according to formula (6) above and to step 208 whereat $\Delta T_D$ is calculated according to formula (5) above. Formulas (5) and (6) take into account the desired processing temperature ($T_D$). The processing temperature is selected to be above the melting point of the thermoplastic matrix but below a temperature at which the tape will degrade or become damaged. Thus, for example, PEEK has a melting point of about 630° F., but it is more easily handled at temperatures between 700° F. and 730° F., which is above the melting point but below the temperature at which it will degrade. Preferably, the processing temperature of tape made from PEEK is about 700° F.

The sequence of FIG. 4 then proceeds to determine the predictive or feed forward component $U_{FF}$ of control word $U_1$ by calculating $H_{LOS}$ according to formula (1) at step 210, $H_{LOD}$ according to formula (2) at step 212, q according to formula (3) at step 214 and finally $U_{FF}$ according to formula (4) at step 216.

After $U_{FF}$ has been determined, the value of $U_{COMP}$ is determined. First, $U_P$ is calculated at step 218 according to formula (7) and then $U_{COMP}$ is determined at step 220 by adding $U_P$ and $U_I$ in accordance with formula (12). Although not shown, the value of XT and $U_I$ are initially set to zero at power up or reset of system 10 so that upon the first iteration of the sequence of FIG. 4, those values are zero.

After $U_{comp}$ is calculated, the state signal XT and the integrator value $U_I$ may be updated. To this end, the sequence of FIG. 4 continues at step 224 whereat XT is updated in accordance with formula (10). Thereafter, the integrator value $U_I$ is to be updated. However, to avoid unwanted oscillation, limits on the value of $U_I$ are imposed. To this end, the absolute value of $T_{err}$ is compared at step 228 to a maximum allowable error (MAX$_1$) which in one embodiment is 100° F. The value of $U_I$ is compared to a system limit (MAX$_2$) at step 230 to avoid overdriving amplifiers 72, 78. MAX$_2$ in one embodiment is 10.0. If either $T_{err}$ or $U_I$ is equal to or above its respective limit, $U_I$ is updated to zero at step 232. Otherwise, the sequence proceeds to step 234 where $U_I$ is updated according to formula (11). After $U_I$ is updated at either step 232 or step 234, control word $U_1$ is calculated at step 236 such that the value of $U_{COMP}$ is superimposed on the value of $U_{FF}$ according to formula (13). Although not shown in FIG. 4, in the event that overheating occurs during tape standstill or as the tape first begins to move, the predictive component $U_{FF}$ may be forced to zero during such times.

Before transmitting the value of $U_1$ to amplifier 72, it is tested at step 238 to be sure it is not negative. If it is, $U_1$ is set equal to zero at step 240 to avoid trying to seek negative radiant energy emission from bulbs 42. If $U_1$ is positive, $U_1$ is again tested at step 242 to make sure it does not exceed the range of signals allowed to be output as a control word. If $U_1$ does exceed this value (which in one embodiment is 10.0), $U_1$ is set equal to that maximum value at step 244. If not, or after one of steps 240 and 244, the previously-determined value of $U_1$ may be provided to amplifier 72. In accordance with the described embodiment, however, the value of the second control word $U_2$ is first determined. To this end, the sequence proceeds to step 246 to calculate control word $U_2$ to drive lower bulbs 50. $U_2$ is calculated in accordance with formula (14) where $K_{p2} = 1.0$ in one embodiment. $U_2$ should also be limited between zero and a maximum. As $U_1$ was prevented from being less than zero at step 238, $U_2$ need not be tested for this condition as long as $K_{p2}$ is positive, as is preferred. Hence, $U_2$ is tested only against the maximum (in one embodiment this is, again, 10.0) at step 248 and set equal thereto at step 250 if it would otherwise exceed the maximum. Once $U_1$ and $U_2$ are calculated and limited, if necessary, they are output at step 252 to amplifiers 72, 78, respectively, whereby to drive bulbs 42, 50, respectively.

In operation, tape 20 will be applied to surface 30 as applicator 12 moves from left to right in FIG. 1 and as tape 20 travels from spool 40, through heater housing 22 to terminus 96 whereat shoe 32 compacts tape 20 against surface 30. In response to control words $U_1$ and $U_2$, amplifiers 72 and 78 energize bulbs 42 and 50, respectively, to appropriate levels to elevate the temperature of tape 20 to the processing temperature just prior to application to surface 30 which is also heated. The levels of radiant energy emitted will be determined from temperature and velocity of tape 20 and consideration of the plant model characteristics of system 10 and tape 20 so that the energization level of bulbs 42 is determined in accordance with a prediction of the necessary amount of energy to raise the temperature of the tape to the processing temperature (and at which the thermoplastic matrix of the tape is melted) and as compensated by an amount proportionally and integrally related to the error between actual and desired temperature of tape 20.

By virtue of the foregoing, there is thus provided an infrared heating control system by which to melt the thermoplastic matrix of a travelling web of thermoplastic composite tape irrespective of velocity or changes in velocity of the tape so that the tape may be readily applied by a computerized tape-laying machine.

While the present invention has been illustrated by description of one embodiment which has been described in considerable detail, it is not the intention of applicant to restrict or in any way limit the scope of the appended claims to such detail. Additional advantages and modifications will readily appear to those skilled in the art. For example, due to the arrangement of housing 22 and bulbs 50, the embodiment described herein is suited for use when layup tool provides a generally flat surface 30. Modifications to housing 22 and/or bulbs 50 may be made to facilitate use of the present invention for applying thermoplastic composite tape to layup tools having a contoured surface. Also, bulbs 42 heat surface 46 while sensor 84 monitors surface 92 of tape 20. As a consequence, the sensor monitors radiant energy emitted from the surface of the tape which is not applied directly to surface 30. To monitor contacting surface 46 of tape 20, bulbs 42 and sensor 84 may be repositioned relative to slot 26 in an orientation opposite that shown in FIG. 1. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. Apparatus for heating thermoplastic composite tape travelling along a tape path, the tape being heated to a processing temperature for application to a surface at a terminus of the tape path, the apparatus comprising:
   a. infrared heating means adjacent the tape path for generating a variable amount of radiant energy for heating the thermoplastic composite tape as it travels relative the heating means;
   b. thermal sensing means for generating a temperature signal corresponding to the temperature of the heated tape;
   c. velocity sensing means for generating a velocity signal corresponding to the velocity of the tape relative to the heating means; and
   d. system means responsive to the temperature signal and the velocity signal for generating a control signal having a compensation component relating energy required for tape heating to the difference between the desired processing temperature and the temperature of the heated tape represented by the temperature signal, and a predictive component relating energy required for tape heating to the volume of tape moving relative the heating means per unit time, said infrared heating means being responsive to said control signal to generate said amount of radiant energy.

2. The apparatus of claim 1, said thermal sensing means including an infrared pyrometer focused on the tape and shielded from radiant energy generated by said infrared heating means.

3. The apparatus of claim 2, said infrared heating means including at least one radiant energy source disposed to one side of the tape path, said thermal sensing means being disposed to another side of the tape path such that the tape travelling along the path shields said thermal sensing means from said source.

4. The apparatus of claim 1 wherein the system means comprises a processor means for periodically determining the value of the control signal.

5. The apparatus of claim 4, said processor means including a digitized lead-lag filter with a parallel integrator, said compensation component being correlated to the difference by processing difference through said filter and integrator.

6. The apparatus of claim 1 further including:
   air blast means for cooling the heated tape such that the compensation component is caused to be increased whereby to change the operating point of the infrared heating means to increase responsiveness thereof to changes in the control signal 7. The apparatus of claim 1 further including a movable tape applicator supporting for movement therewith said infrared heating means and a source of supply of the tape, said tape path being movable with said tape applicator.

8. A system for heating thermoplastic composite tape travelling along a tape path, the tape being heated to a processing temperature for application to a surface at a terminus of the tape path, the system comprising:
   a. infrared heating means adjacent the tape path and responsive to a control signal to generate a variable amount of radiant energy for heating the thermoplastic composite tape as it travels relative the heating means;
   b. thermal sensing means for generating a temperature signal corresponding to the temperature of the heated tape;
   c. velocity sensing means for generating a velocity signal corresponding to the velocity of the tape relative to the heating means; and
   d. control means responsive to said temperature and velocity signals for generating said control signal, said control signal being correlated to the velocity of the tape, the difference between a desired processing temperature and the temperature of the unheated tape, and the difference between the desired processing temperature and the temperature of the heated tape, the control signal controlling the heating means so as to heat the tape to a processing temperature irrespective of the tape velocity and changes in the tape velocity.

9. The system of claim 8, said control means including:
   first means responsive to said temperature signal for generating a first signal at least proportionally related to the difference between the temperature of the heated tape and a desired processing temperature at which the thermoplastic matrix of the tape would be in a melting condition;
   second means responsive to said velocity signal for generating a second signal at least proportionally related to the velocity of the tape; and
   third means responsive to said first and second means for generating said control signal, said control signal being proportional to the sum of the first and second signals, whereby said control signal is correlated to the temperature and velocity of the tape.

10. The system of claim 8, said control means including:
   first means responsive to said temperature signal for generating a first signal proportionally related to the difference between the temperature of the heated tape and a desired processing temperature at which the thermoplastic matrix of the tape would be in a melting condition;
   second means responsive to said temperature signal for generating a second signal integrally related to the difference between the temperature of the heated tape and the desired processing temperature;
   third means responsive to said velocity signal for generating a third signal at least proportionally related to the velocity of the tape; and
   fourth means responsive to said first, second and third means for generating said control signal, said control signal being proportional to the sum of said first, second and third signals, whereby said control signal is correlated to the temperature and velocity of the tape.

11. The system of claim 8, said control means including:
- first means responsive to said temperature signal for generating a first signal proportionally related to the difference between the temperature of the heated tape and a desired processing temperature at which the thermoplastic of the tape would be in a melting condition;
- second means responsive to said temperature signal for generating a second signal integrally related to the difference between the temperature of the heated tape and the desired processing temperature;
- third means responsive to said velocity and temperature signals for generating a third signal correlated to both said velocity signal and plant model characteristics of said infrared heating means and the tape; and
- fourth means responsive to said first, second and third means for generating said control signal, said control signal being proportional to the sum of said first, second and third signals, whereby said control signal is correlated to the temperature and velocity of the tape.

12. The system of claim 8, said infrared heating means and said thermal sensing means being disposed so that said tape path defines a plane therebetween whereby the tape travelling along the tape path will shield the thermal sensing means from said radiant energy generated by said infrared heating means.

13. The system of claim 12, said thermal sensing means including an infrared pyrometer.

14. The system of claim 12, said infrared heating means including a housing having a diagonal slot therein colinear the tape path, and at least one quartz bulb mounted in said housing and on one side of said diagonal slot, said thermal sensing means mounted to said housing opposite said quartz bulb whereby said thermal sensing means is on a side of the diagonal slot opposite said one side whereby tape travelling through the diagonal slot shields the thermal sensing means from the radiant energy emitted by the quartz bulb.

15. The system of claim 8 further including a movable tape applicator supporting said infrared heating means and a source of supply of the tape, said tape path being movable with said tape applicator.

16. A method of heating thermoplastic composite tape travelling along a tape path, the tape being heated to a processing temperature for application to a surface at a terminus of the tape path, the method comprising the steps of:
- a. generating a variable amount of radiant energy for heating the thermoplastic composite tape as it travels relative a source of said radiant energy;
- b. generating a temperature signal corresponding to the temperature of the heated tape;
- c. generating a velocity signal corresponding to the velocity of tape relative the source of radiant energy;
- d. generating a control signal having a compensation component relating energy required for tape heating to the difference between a desired processing temperature and the temperature of the heated tape represented by the temperature signal and a predictive component relating energy required for tape heating to the volume of tape moving relative the heating means per unit time as determined from the velocity signal; and
- e. varying the amount of radiant energy generated in accordance with said control signal to generate said amount of radiant energy.

17. The method of claim 16, wherein said temperature signal is generated by an infrared pyrometer, the method further comprising:
- shielding the infrared pyrometer from said variable amount of radiant energy by passing the tape between a source of the variable amount of radiant energy and the infrared pyrometer.

18. A method of heating thermoplastic composite tape travelling along a tape path, the tape being heated to a processing temperature for application to a surface at a terminus of the tape path, the method comprising the steps of:
- a. generating in response to a control signal a variable amount of radiant energy for heating the thermoplastic composite tape as it travels relative a source of said radiant energy;
- b. generating a temperature signal corresponding to the temperature of the heated tape;
- c. generating a velocity signal corresponding to the velocity of the tape relative the source of radiant energy; and
- d. generating in response to said temperature and velocity signals said control signal, said control signal being correlated to the temperature of the unheated tape, the temperature of the heated tape, and the velocity of the tape whereby to control the amount of radiant energy generated so that the travelling tape is heated to a processing temperature irrespective of the velocity and changes in the velocity of the tape along the tape path.

19. The method of claim 18 further comprising:
- generating, in response to said temperature signal, a first signal at least proportionally related to the difference between the temperature of the heated tape and a desired processing temperature at which the thermoplastic matrix of the tape would be in a melting condition; and
- generating, in response to said velocity signal, a second signal at least proportionally related to the velocity of the tape, said control signal being proportional to the sum of said first and second signals, whereby said control signal is correlated to the temperature and velocity of the tape.

20. The method of claim 18 further comprising:
- generating, in response to said temperature signal, a first signal proportionally related to the difference between the temperature of the heated tape and a desired processing temperature at which the thermoplastic of the tape would be in a melting condition;
- generating, in response to said temperature signal, a second signal integrally related to the difference between the temperature of the heated tape and the desired processing temperature; and
- generating, in response to said velocity signal, a third signal at least proportionally related to the velocity of the tape, said control signal being proportional to the sum of said first, second and third signals, whereby said control signal is correlated to the temperature and velocity of the tape.

21. The method of claim 18, further comprising including:
- generating, in response to said temperature signal, a first signal proportionally related to the difference between the temperature of the heated tape and a desired processing temperature at which the thermoplastic of the tape would be in a melting condition;

generating. in response to said temperature signal. a second signal integrally related to the difference between the temperature of the heated tape and the desired processing temperature; and generating. in response to said velocity signal. a third signal correlated to both said velocity and to plant model characteristics of a source of radiant energy and the tape. said control signal being proportional to the sum of said first. second and third signals. whereby said control signal is correlated to the temperature and velocity of the tape.

22. The method of claim 18 wherein said temperature signal is generated by an infrared pyrometer. the method further comprising:
shielding the infrared pyrometer from said radiant energy by passing the tape between a source of the variable amount of radiant energy and the infrared pryometer.

23. The method of claim 18. further comprising:
increasing the amount of variable radiant energy generated such that the amount of variable radiant energy varies rapidly in response to changes in the control signal.

24. The method of claim 16 further comprising cooling the heated tape such that the compensation component increases the level of radiant energy produced whereby the amount of radiant energy generated is varied rapidly in response to changes in the control signal.

* * * * *